US012576923B2

(12) United States Patent
Murakami et al.

(10) Patent No.: US 12,576,923 B2
(45) Date of Patent: Mar. 17, 2026

(54) WORK VEHICLE

(71) Applicant: KOMATSU LTD., Tokyo (JP)

(72) Inventors: Souichirou Murakami, Tokyo (JP);
Hirofumi Kotaki, Tokyo (JP); Daisuke Okamoto, Tokyo (JP); Kouji Nagami, Tokyo (JP); Yohei Takahashi, Tokyo (JP); Osamu Yatsuda, Tokyo (JP); Hironori Yamamitsu, Tokyo (JP)

(73) Assignee: KOMATSU LTD., Tokyo (JP)

( * ) Notice: Subject to any disclaimer, the term of this patent is extended or adjusted under 35 U.S.C. 154(b) by 342 days.

(21) Appl. No.: 18/362,173

(22) Filed: Jul. 31, 2023

(65) Prior Publication Data

US 2024/0101199 A1      Mar. 28, 2024

(30) Foreign Application Priority Data

Sep. 26, 2022    (JP) ................................. 2022-153007

(51) Int. Cl.
B62D 33/06        (2006.01)
B60R 21/13        (2006.01)
B62D 27/04        (2006.01)

(52) U.S. Cl.
CPC ......... B62D 33/0604 (2013.01); B62D 27/04 (2013.01); B60R 21/13 (2013.01)

(58) Field of Classification Search
CPC   B62D 33/0617; B62D 33/0604; B62D 27/04; B60R 21/13
See application file for complete search history.

(56) References Cited

U.S. PATENT DOCUMENTS

| | | | | |
|---|---|---|---|---|
| 8,246,107 B2 * | 8/2012 | Miyasaka | .......... | B62D 33/0604 296/190.03 |
| 2002/0033288 A1 * | 3/2002 | Okazawa | ........... | B62D 33/0604 180/89.14 |
| 2008/0252102 A1 * | 10/2008 | Fukunaga | ............. | B60R 13/083 296/190.08 |
| 2009/0314911 A1 * | 12/2009 | Kamimae | ............... | E02F 9/166 248/276.1 |
| 2010/0176624 A1 | 7/2010 | Kamimae | | |
| 2019/0193795 A1 * | 6/2019 | Young | ................... | B62D 24/04 |

FOREIGN PATENT DOCUMENTS

| | | | | |
|---|---|---|---|---|
| FR | 2909396 A1 * | 6/2008 | .............. | E02F 9/166 |
| WO | 2008/066108 A1 | 6/2008 | | |

* cited by examiner

*Primary Examiner* — Lori Lyjak

(74) *Attorney, Agent, or Firm* — Spencer Fane LLP

(57) ABSTRACT

A work vehicle includes a vehicle body frame, a cab disposed on an upper side of the vehicle body frame, brackets connected to the cab, limiting sections and buffering devices. The limiting sections are disposed between the brackets and the vehicle body frame. The limiting sections limit a movement range of the cab with respect to the vehicle body frame. The buffering devices are disposed between the brackets and the vehicle body frame.

8 Claims, 13 Drawing Sheets

A1 ⟵⟶ A2

13

61

62

62

65

61

62

63

62

62

64

61

51a

61

51

52

B2    A2

A1    B1

35

9

31

75 71 72

73 72 71 71 75

71
75
72

72
75
71

33

311

71
75
72

72
75
71

312

73 72 71 71 75
75 71 72

35

B2

A1 ← → A2

B1

WORK VEHICLE

CROSS-REFERENCE TO RELATED APPLICATIONS

This application claims priority to Japanese Patent Application No. 2022-153007 filed in Japan on Sep. 26, 2022. The entire disclosure of Japanese Patent Application No. 2022-153007 is hereby incorporated herein by reference.

BACKGROUND

Field of the Invention

The present invention relates to a work vehicle.

Background Information

In a work machine such as a bulldozer, a damper mount is disposed between the vehicle body frame and the floor section of the cab in order to dampen and alleviate vibrations and shocks acting on the cab and improve riding comfort (see International Publication WO 2008/066108).

In addition, a work machine such as a bulldozer has a roll-over protective structure (ROPS) function on the cab frame so as to be able to protect the driver in the situation of a roll-over even when an excessive load is acting on the cab frame due to the vehicle body weight. With this ROPS function, a limiting mechanism for limiting movement of the cab with respect to the vehicle body frame is provided between the vehicle body frame and the floor section of the cab to cope with the excessive load.

SUMMARY

However, in the configuration indicated in International Publication WO 2008/066108, because the damper mount and the limiting mechanism are assembled separately to the cab in a rear section of the cab, there is a need to remove both the damper mount and the limiting mechanism when detaching the cab from the vehicle body frame, and the detachment of the cab is time-consuming.

An object of the present disclosure is to provide a work vehicle with which it is possible to improve the releasability of the cab from the vehicle body frame.

A work vehicle according to a first embodiment of the present disclosure comprises a vehicle body frame, a cab, brackets, limiting sections, and buffering devices. The cab is disposed on the upper side of the vehicle body frame. The brackets are connected to the cab. The limiting sections are disposed between the brackets and the vehicle body frame, and limit the movement range of the cab with respect to the vehicle body frame. The buffering devices are disposed between the brackets and the vehicle body frame.

According to the present disclosure, there can be provided a work vehicle with which it is possible to improve releasability of the cab from the vehicle body frame.

DETAILED DESCRIPTION OF EMBODIMENT(S)

A work vehicle of an embodiment according to the present disclosure will be explained with reference to the drawings.
Configuration
(Outline of Bulldozer 1)

Figure 1:
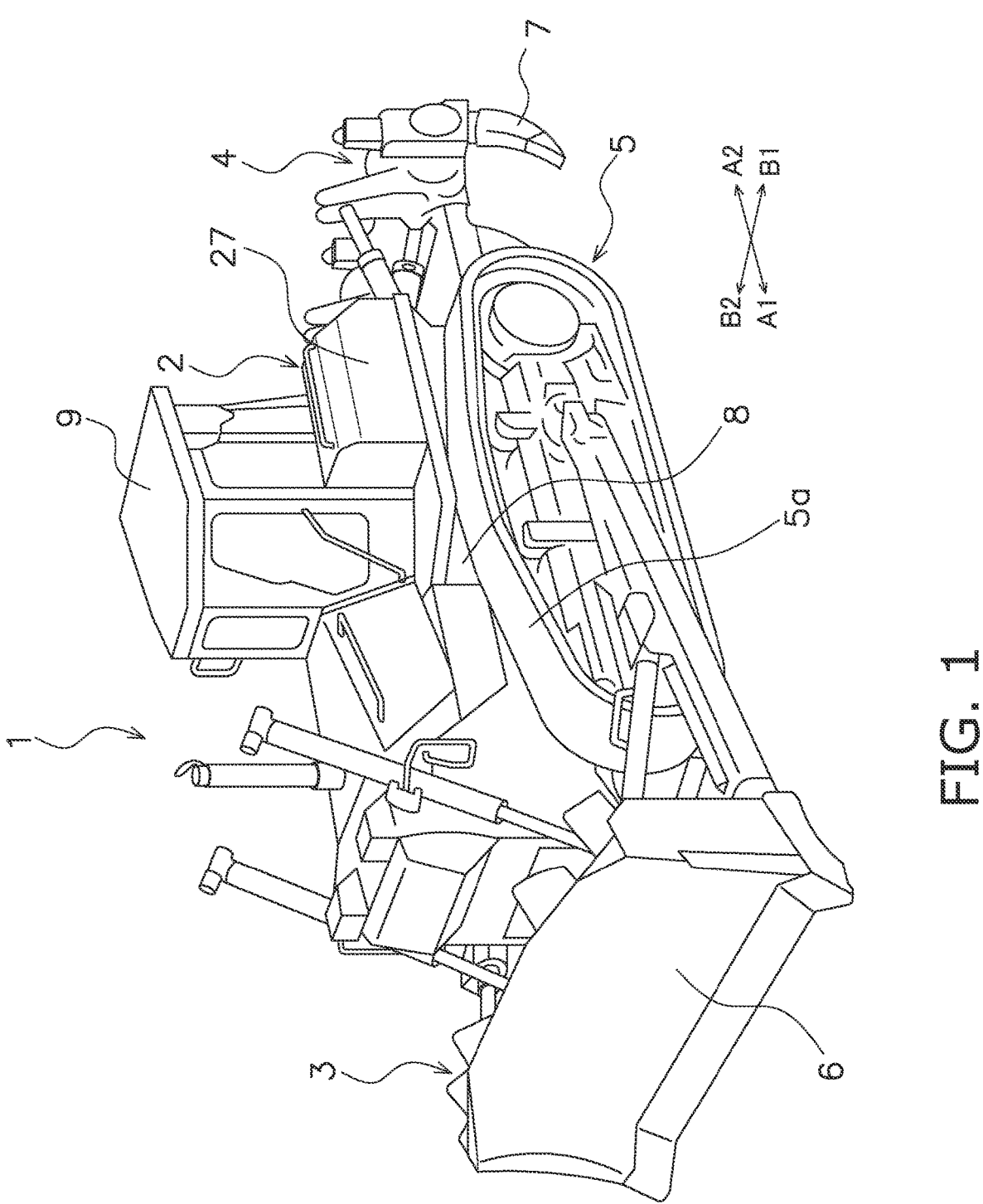
FIG. 1 is a perspective view illustrating a bulldozer in an embodiment according to the present disclosure.

FIG. 1 is a perspective view illustrating a bulldozer 1 (example of a work vehicle) of the present embodiment. The bulldozer 1 has a vehicle body 2, a work implement 3, a ripper device 4, and a travel device 5.

The work implement 3 is disposed in front of the vehicle body 2. The work implement 3 has a blade 6 for performing work such as excavating earth and sand. The ripper device 4 is disposed to the rear of the vehicle body 2. The ripper device 4 has a claw section 7 for breaking apart rock, etc.

The travel device 5 is disposed on the vehicle body 2. The travel device 5 has a pair of left and right crawler belts 5a. In FIG. 1, only the crawler belt 5a on the left side is illustrated.

Figure 2:
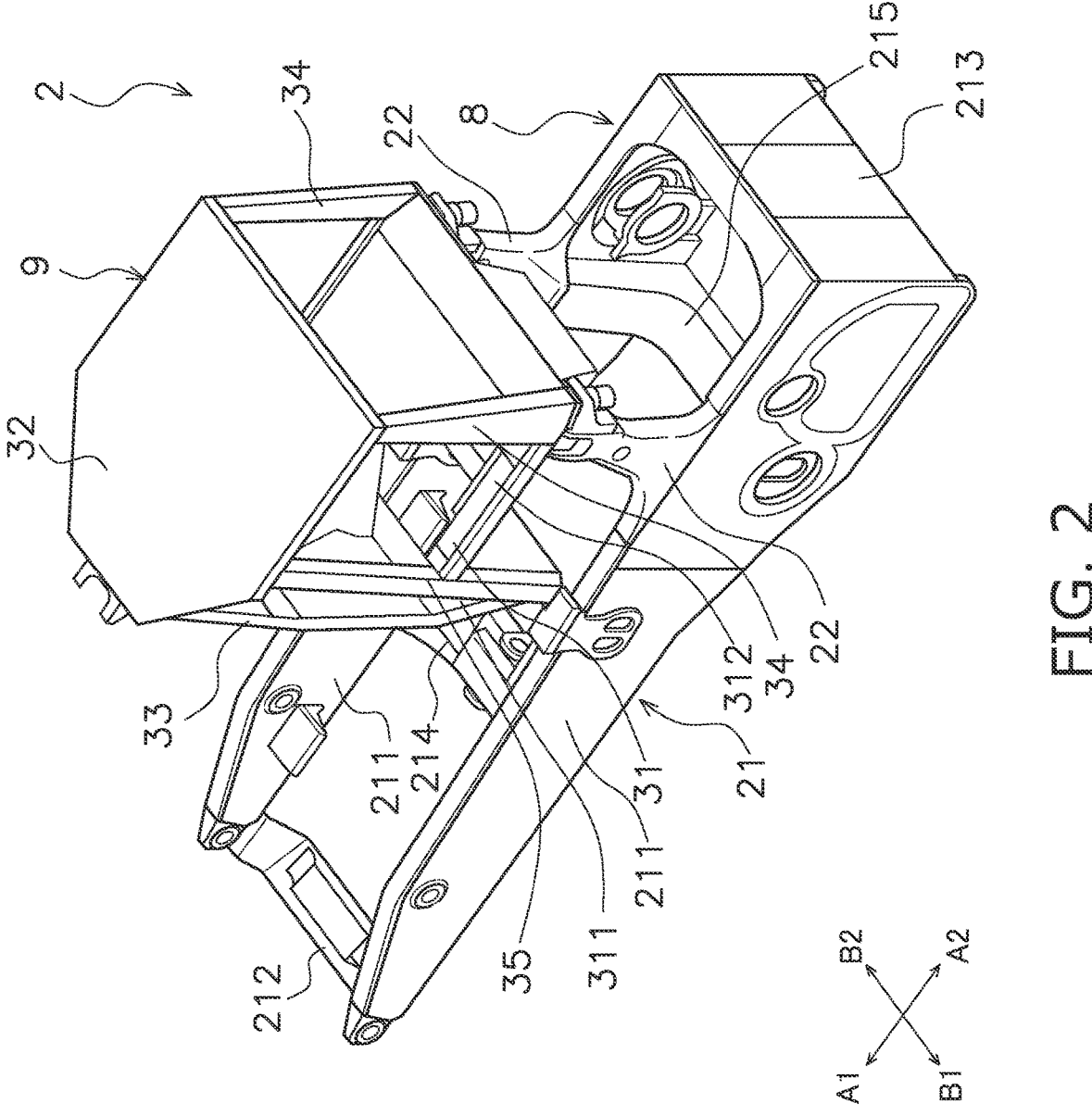
FIG. 2 is a perspective view of a vehicle body in an embodiment according to the present disclosure.
Figure 3:
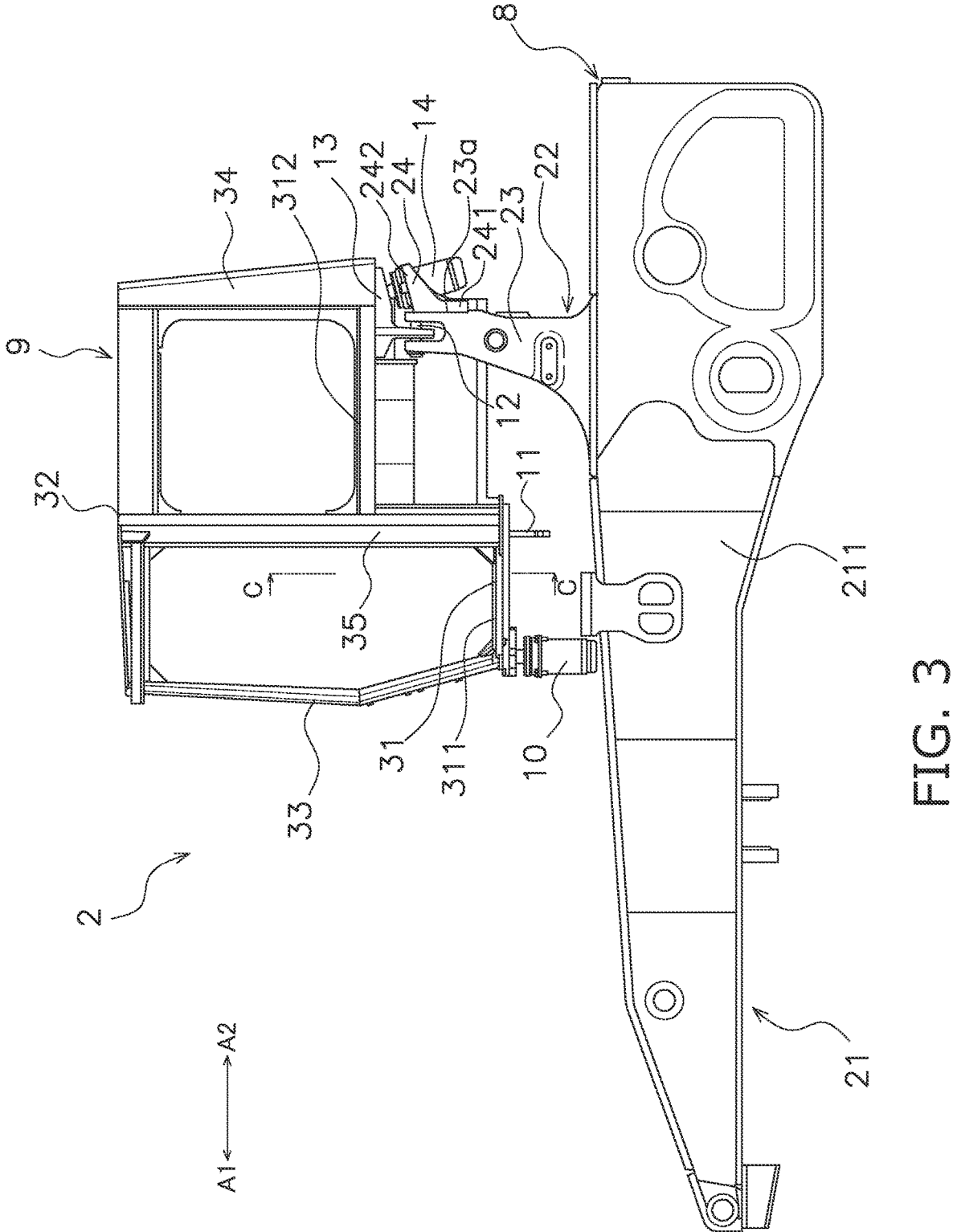
FIG. 3 is a left side view of the vehicle body in an embodiment according to the present disclosure.
Figure 4:
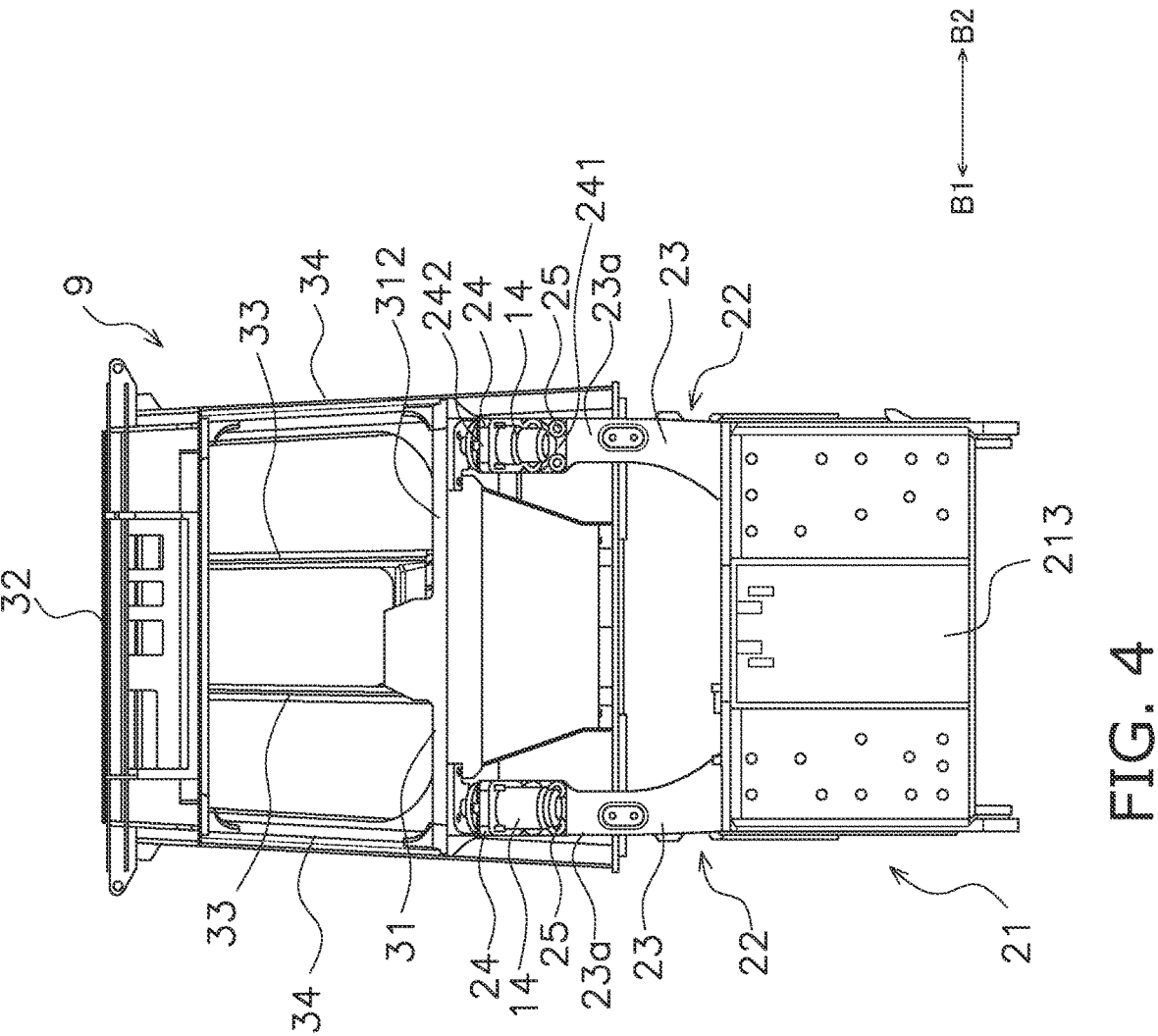
FIG. 4 is a rear view of the vehicle body in an embodiment according to the present disclosure.

FIG. 2 is a perspective view of the vehicle body 2. FIG. 3 is a left side view of the vehicle body 2. FIG. 4 is a rear view of the vehicle body 2 from the rear.

As illustrated in FIG. 3, the vehicle body 2 has a vehicle body frame 8, a cab 9, a pair of left and right front side damper mounts 10, a pair of left and right front side limiting sections 11, a pair of left and right rear side limiting sections 12 (example of the limiting section), a pair of left and right brackets 13, and a pair of left and right rear side damper mounts 14 (example of the buffering device).

The cab 9 is disposed on the vehicle body frame 8. The abovementioned work implement 3, the ripper device, 4, and the travel device 5 are attached to the vehicle body frame 8. The brackets 13 are connected to the cab 9.

The cab 9 is supported on the vehicle body frame 8 by means of the pair of rear side damper mounts 14 and the pair of front side damper mounts 10. The pair of rear side limiting sections 12 and the pair of front side limiting sections 11 limit movement of the cab 9 from the vehicle body frame 8 during a roll-over or the like.

In the present embodiment, front and rear and left and right are explained using the driver's seat of the cab 9 as reference. The direction in which the driver's seat of the cab 9 faces forward represents the forward direction A1, and the direction opposite the forward direction A1 represents the rearward direction A2. The left side and the right side in the lateral direction when the driver's seat is facing forward are respectively represented as the leftward direction B1 and the rightward direction B2. The left and right direction may also be referred to as the vehicle width direction.

(Vehicle Body Frame 8)

As illustrated in FIG. 2, the vehicle body frame 8 includes a frame body 21 and a pair of supporting members 22. The frame body 21 has a pair of left and right side sections 211, a front side connecting section 212, a rear side connecting section 213, and intermediate connecting sections 214 and 215. The pair of side sections 211 are both plates. The pair of side sections 211 are disposed facing each other in the left-right direction.

The front side connecting section 212 is disposed along the left-right direction. The front side connecting section 212 joins the front end of the left side side section 211 and the front end of the right side side section 211. The rear side connecting section 213 is disposed along the left-right direction. The rear side connecting section 213 joins the rear end of the left side side section 211 and the rear end of the right side side section 211. The intermediate connecting sections 214 and 215 are disposed between the front side connecting section 212 and the rear side connecting section 213. The intermediate connecting sections 214 and 215 are both disposed along the left-right direction and join the left side side section 211 and the right side side section 211.

The pair of supporting members 22 support the rear side of the cab 9. The pair of supporting members 22 extend upward from the frame body 21. The supporting members 22 are fixed to the frame body 21. The pair of supporting members 22 are disposed facing each other in the left-right direction. The left side supporting member 22 is fixed to the upper end of the left side side section 211. The right side supporting member 22 is fixed to the upper end of the right side side section 211.

Figure 5:
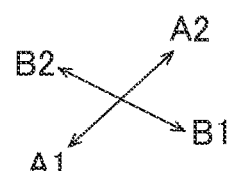
FIG. 5 is a perspective view illustrating a lower section of the cab and supporting members in an embodiment according to the present disclosure.
Figure 6:
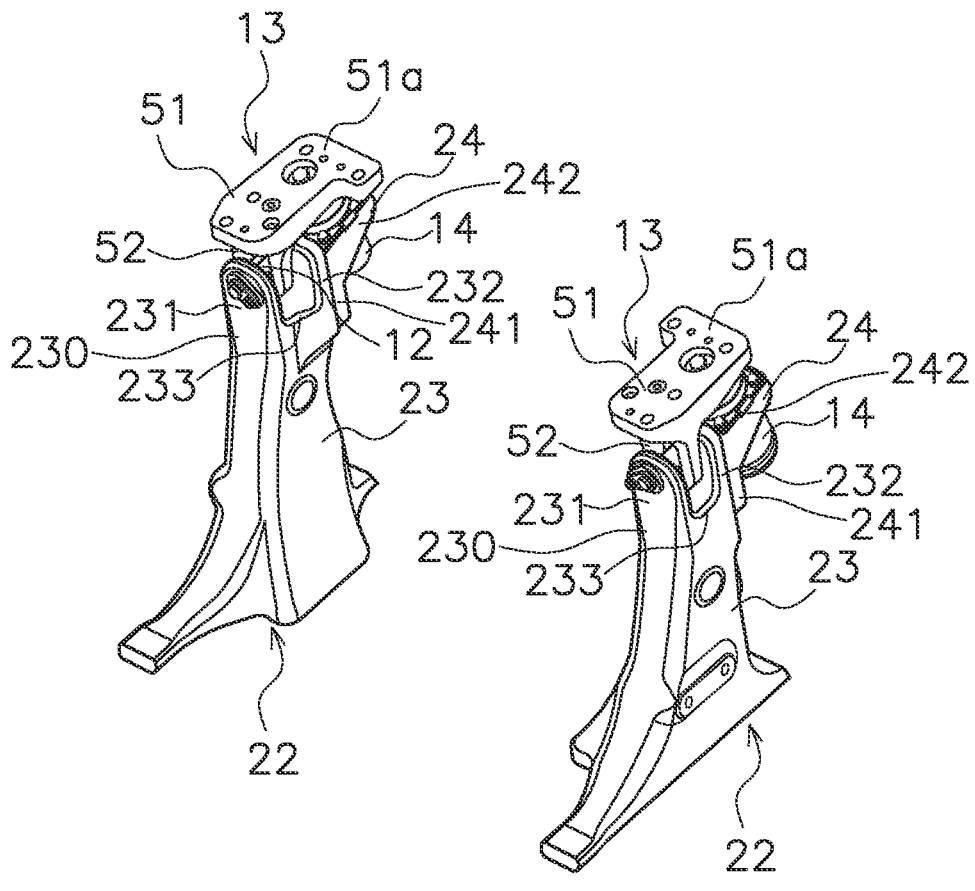
FIG. 6 is a perspective view illustrating a pair of supporting members and a pair of brackets in an embodiment according to the present disclosure.
Figure 6:
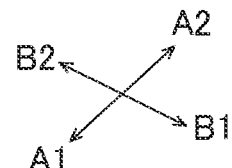
Figure 7:
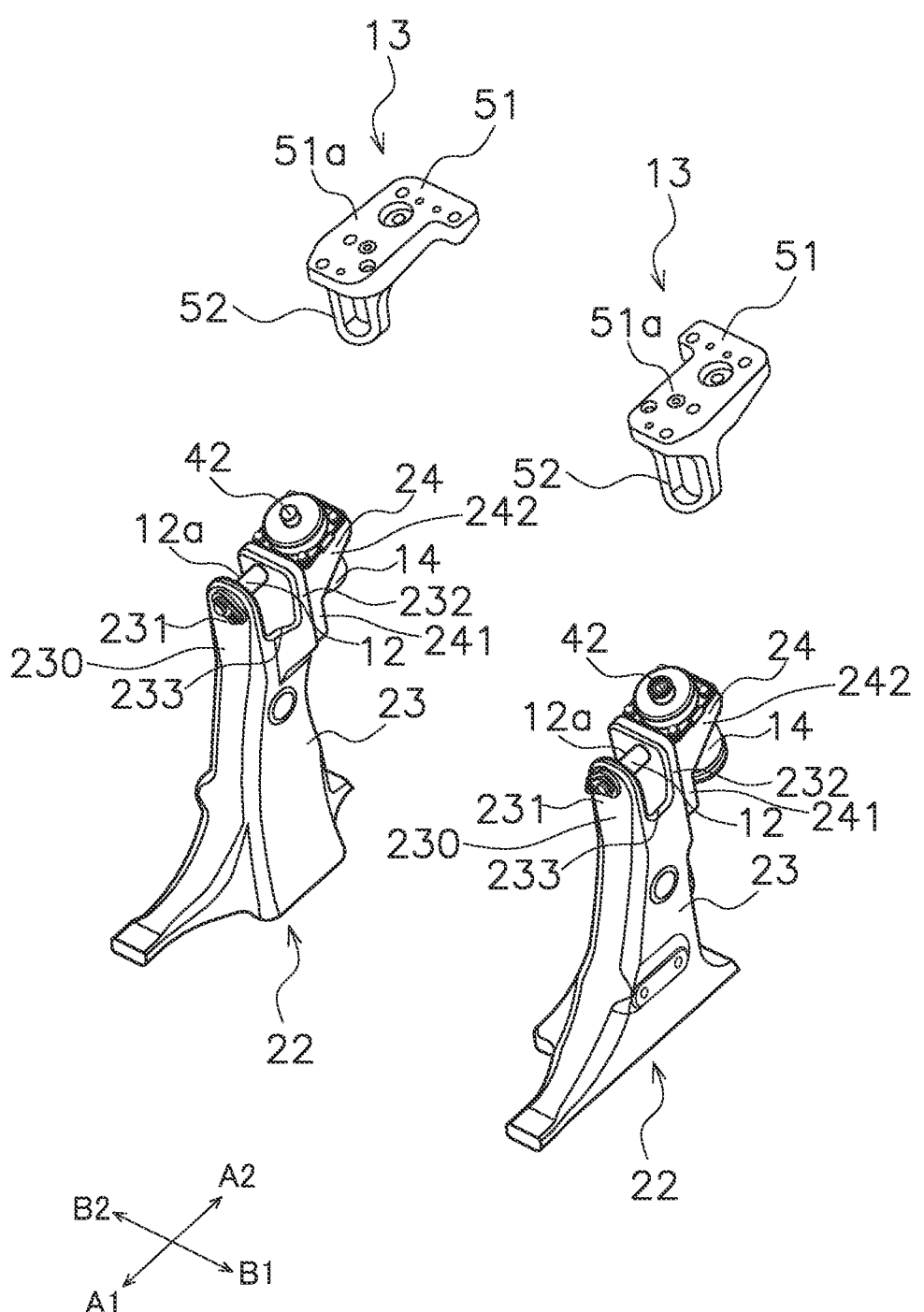
FIG. 7 is an exploded perspective view illustrating the pair of supporting members and the pair of brackets in an embodiment according to the present disclosure.

FIG. 5 is a perspective view illustrating the lower section of the cab 9 and the supporting members 22. FIG. 6 is a perspective view illustrating the pair of supporting members 22 and the pair of brackets 13. FIG. 6 is a perspective view illustrating a state in which the cab is removed in FIG. 5. FIG. 7 is an exploded perspective view illustrating the pair of supporting members 22 and the pair of brackets 13.

As illustrated in FIG. 3, the supporting members 22 each have a first supporting section 23 and a second supporting section 24. The first supporting section 23 is in contact with and fixed to the side section 211 of the frame body 21. The first supporting section 23 extends upward from the side section 211. As illustrated in FIG. 7, the first supporting section 23 has a tip end section 230 to which a belowmentioned rear side limiting section 12 is disposed. The configurations of the tip end section 230 and the rear side limiting section 12 are discussed below.

The second supporting section 24 is in contact with and fixed to the first supporting section 23. The second supporting section 24 has a fixing section 241 and a damper supporting section 242. The fixing section 241 is fixed to a rear surface 23a of the first supporting section 23 by a bolt 25 (see FIG. 4). The damper supporting section 242 extends in the rearward direction A2 from the fixing section 241. The damper supporting section 242 supports the rear side damper mount 14. The rear side damper mount 14 is fixed to the damper supporting section 242. In FIG. 4, a portion of a case 41 of the rear side damper mount 14 on the right side is omitted in order to see the bolt 25 more easily.

(Cab 9)

The cab 9 is disposed on the vehicle body frame 8. The cab 9 is supported on the vehicle body frame 8 by means of the pair of rear side damper mounts 14 and the pair of front side damper mounts 10.

As illustrated in FIG. 3 and FIG. 5, the cab 9 has a floor section 31, a ceiling section 32, a pair of left and right front section pillars 33, a pair of left and right rear section pillars 34, and a pair of left and right intermediate pillars 35.

As illustrated in FIG. 3, the floor section has a height difference in the front-back direction. The floor section 31 includes a low section 311 disposed in a portion on the forward direction A1 side, and a high section 312 disposed in a portion on the rearward direction A2 side. The ceiling section 32 is disposed facing the floor section 31 above the floor section 31.

The pair of left and right front section pillars 33 are disposed between the front end of the low section 311 of the floor section 31 and the front end of the ceiling section 32. The left side front section pillar 33 joins an end in the leftward direction B1 side of the front end of the low section 311 and an end in the leftward direction B1 side of the front end of the ceiling section 32. The right side front section pillar 33 joins an end in the rightward direction B2 side of the front end of the low section 311 and an end in the rightward direction B2 side of the front end of the ceiling section 32.

As illustrated in FIG. 4, the pair of left and right rear section pillars 34 are disposed between the high section 312 of the floor section 31 and the ceiling section 32. The left side rear section pillar 34 joins an end in the leftward direction B1 side of the rear end of the high section 312 and an end in the leftward direction B1 side of the rear end of the ceiling section 32. The right side rear section pillar 34 joins an end in the rightward direction B2 side of the rear end of the high section 312 and an end in the rightward direction B2 side of the rear end of the ceiling section 32.

As illustrated in FIGS. 3 and 5, the pair of left and right intermediate pillars 35 are disposed between the low section 311 of the floor section 31 and the ceiling section 32. The pair of intermediate pillars 35 are disposed between the pair of front section pillars 33 and the pair of rear section pillars 34 in the front-back direction. The left side intermediate pillar 35 extends upward from the left end of the rear end of the low section 311 and is connected to the ceiling section 32. The right side intermediate pillar 35 extends upward from the right end of the rear end of the low section 311 and is connected to the ceiling section 32.

As illustrated in FIGS. 5 and 6, the left side supporting member 22, the rear side damper mount 14, and the rear side limiting section 12 are disposed below the left side rear section pillar 34, and the right side supporting member 22, the rear side damper mount 14, and the rear side limiting section 12 are disposed below the right side rear section pillar 34.

As illustrated in FIG. 3 and belowmentioned FIG. 8, the left side front side damper mount 10 is disposed below the left side front section pillar 33, and the right side front side damper mount 10 is disposed below the right side front section pillar 33.

As illustrated in FIG. 3 and belowmentioned FIG. 9, the left side front side limiting section 11 is disposed below the left side intermediate pillar 35, and the right side front side limiting section 11 is disposed below the right side intermediate pillar 35.

(Front Side Damper Mount 10)

Figure 8:
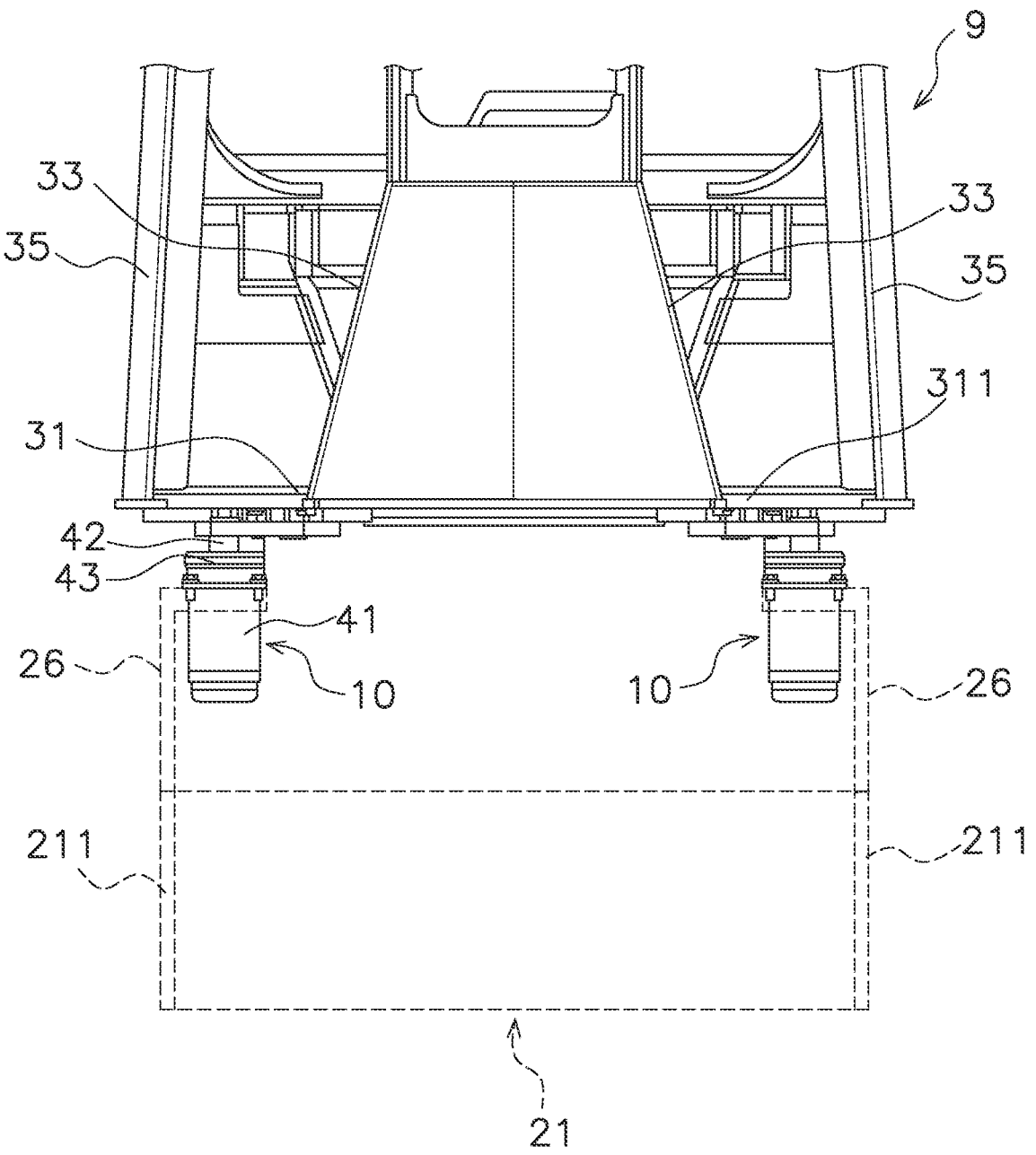
FIG. 8 is a front view illustrating the cab and front side damper mounts in an embodiment according to the present disclosure.

FIG. 8 is a front view illustrating the cab 9 and the front side damper mounts 10. As illustrated in FIG. 8, the left side front side damper mount 10 among the pair of left and right front side damper mounts 10 is disposed on the lower side of the left end at the front end of the floor section 31. The right side front side damper mount 10 is disposed on the lower side of the right end at the front end of the floor section 31. The vehicle body frame 8 further has a pair of left and right supporting members 26 that support the pair of left and right front side damper mounts 10. The left side supporting member 26 extends upward from the left side side section 211 of the frame body 21. The right side supporting member 26 extends upward from the right side side section 211 of the frame body 21. In FIG. 8, the supporting members 26 and the frame body 21 are depicted as dotted lines.

Each of the pair of front side damper mounts 10 has a case 41, a stud 42, a buffering member 43, and a damping liquid in the same way as the belowmentioned rear side damper mounts 14. The case 41 is fixed to the supporting member 26. The stud 42 protrudes upward from the case 41. The upper end of the stud 42 is fixed to the low section 311. The buffering member 43 is disposed between the case 41 and the stud 42. The buffering member 43 is formed with an elastic material such as rubber. The damping liquid is filled inside the case 41. The damping liquid is a damping liquid having a high viscosity such as silicone oil.

In this way, the cab 9 is supported on the vehicle body frame 8 via the front side damper mounts 10.

(Front Side Limiting Section 11)

Figure 9:
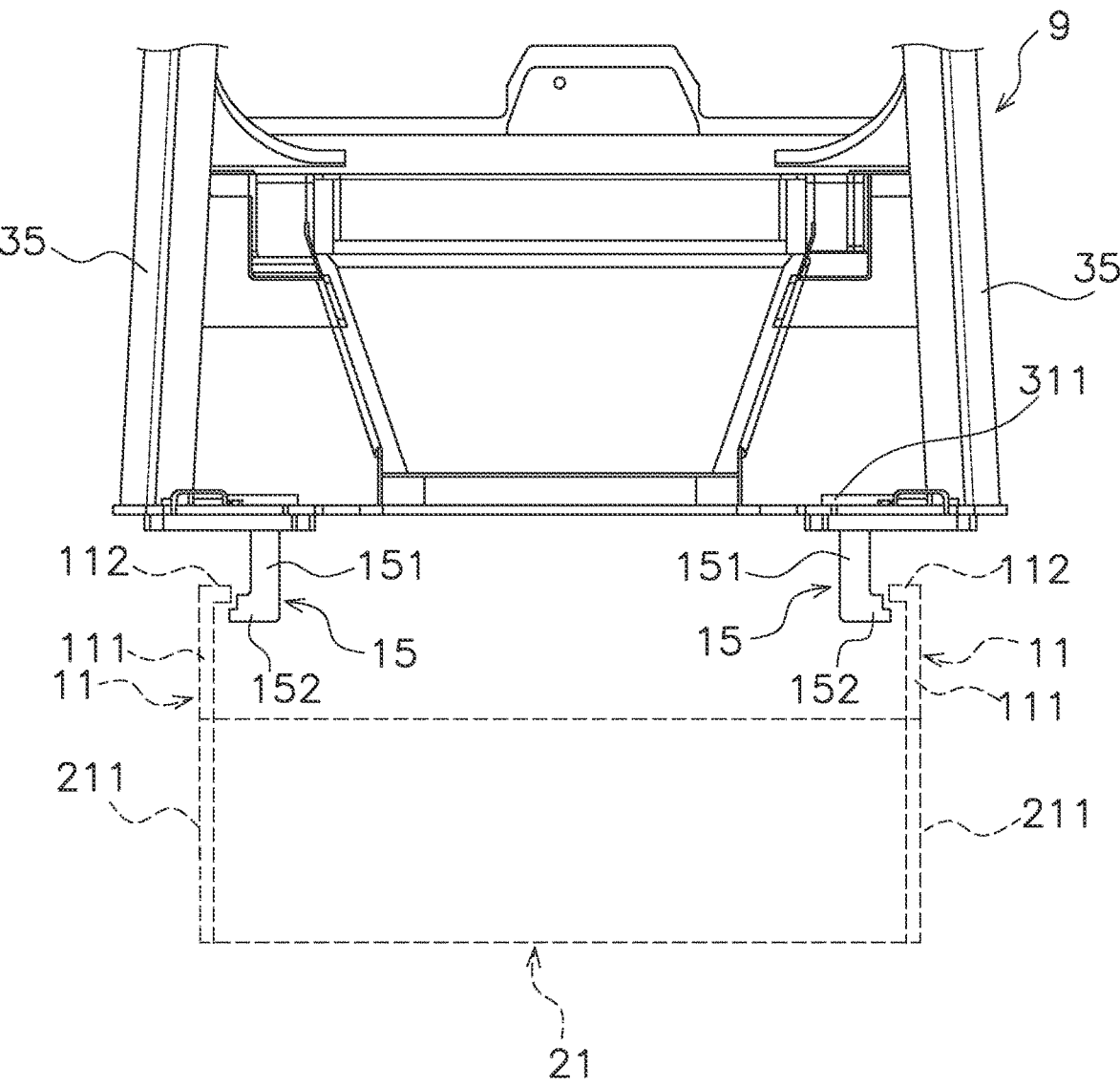
FIG. 9 is a cross-sectional view along line CC in FIG. 3.

FIG. 9 is a cross-sectional view along line CC in FIG. 3. As illustrated in FIG. 9, the pair of left and right front side limiting sections 11 are fixed to the frame body 21. The left side front side limiting section 11 is fixed to the upper end of the left side side section 211. The right side front side limiting section 11 is fixed to the upper end of the right side side section 211.

Each of the front side limiting sections 11 have a vertical section 111 and an inside protruding section 112. The vertical section 111 extends upward from the side section 211. The inside protruding section 112 protrudes toward the inside from the upper end of the vertical section 111.

The vehicle body 2 further has a pair of left and right limited sections 15. The pair of limited sections 15 are disposed roughly in the center in the front-back direction of the cab 9. The pair of limited sections 15 are disposed near the rear end of the low section 311. The pair of limited sections 15 are disposed in positions overlapping the pair of front side limiting sections 11 as seen in a side view.

The left side limited section 15 is disposed on the left surface side of the cab 9. The left side limited section 15 is disposed with an interval between itself and the left side front side limiting section 11. The right side limited section 15 is disposed on the right surface side of the cab 9. The right side limited section 15 is disposed with an interval between itself and the right side front side limiting section 11.

As illustrated in FIG. 9, each of the pair of limited sections 15 has a vertical section 151 and an outside protruding section 152. The vertical section 151 extends downward from the low section 311 of the floor section 31. The outside protruding section 152 protrudes toward the outside from the lower end of the vertical section 151. The respective outside protruding sections 152 of the limited sections 15 on the right and left are disposed lower than the inside protruding sections 112 of the front side limiting sections 11 with gaps therebetween. During a roll-over, the front side limiting sections 11 come into contact with the limited sections 15 whereby movement of the cab 9 from the vehicle body frame 8 can be limited.

The gaps are set to distances such that the front side limiting sections 11 and the limited sections 15 do not come into contact due to vibrations generated during normal work.

(Rear Side Limiting Section 12)

Figure 10:
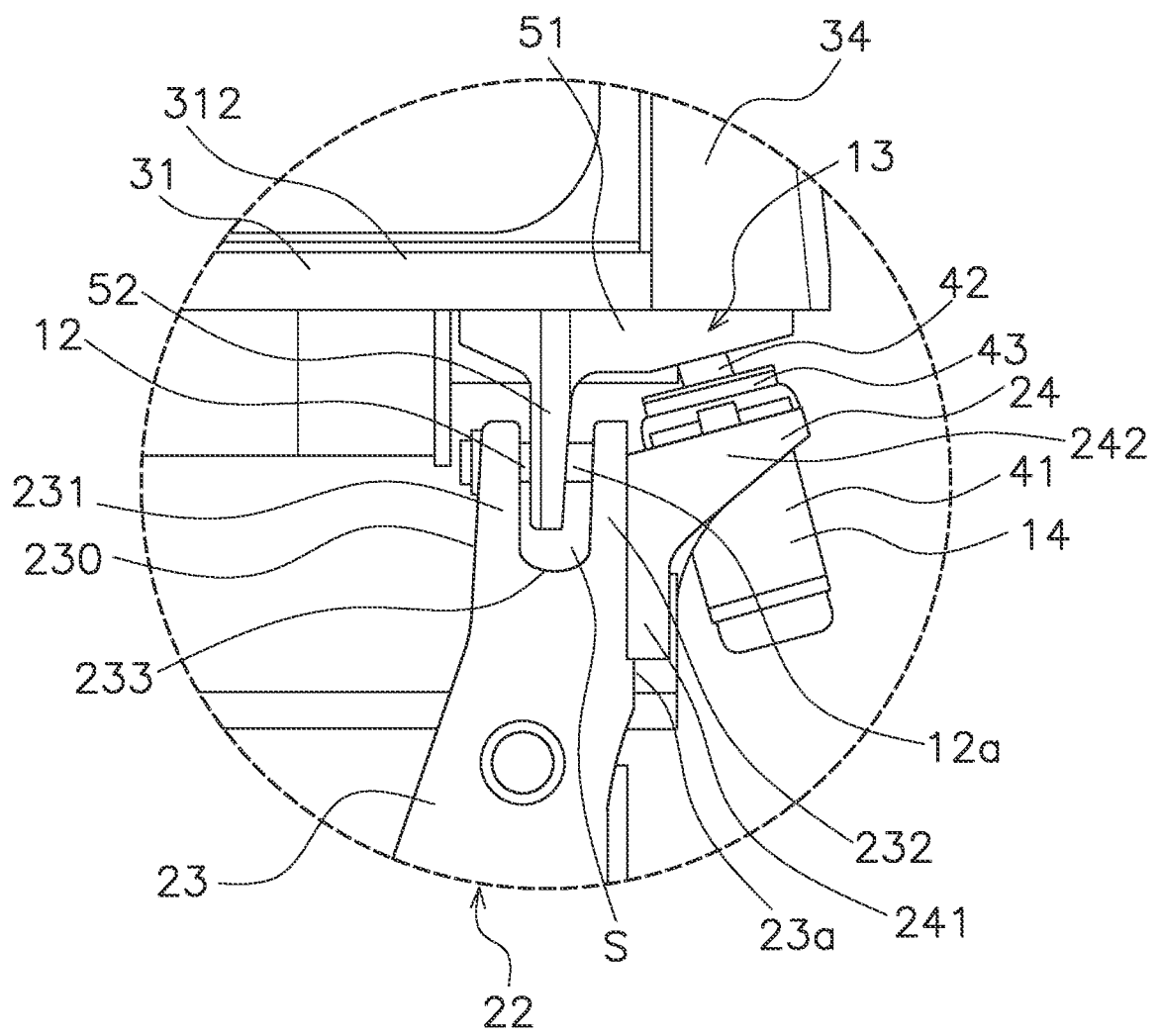
FIG. 10 is a side view illustrating the vicinity of the bracket in an embodiment according to the present disclosure.
Figure 11:
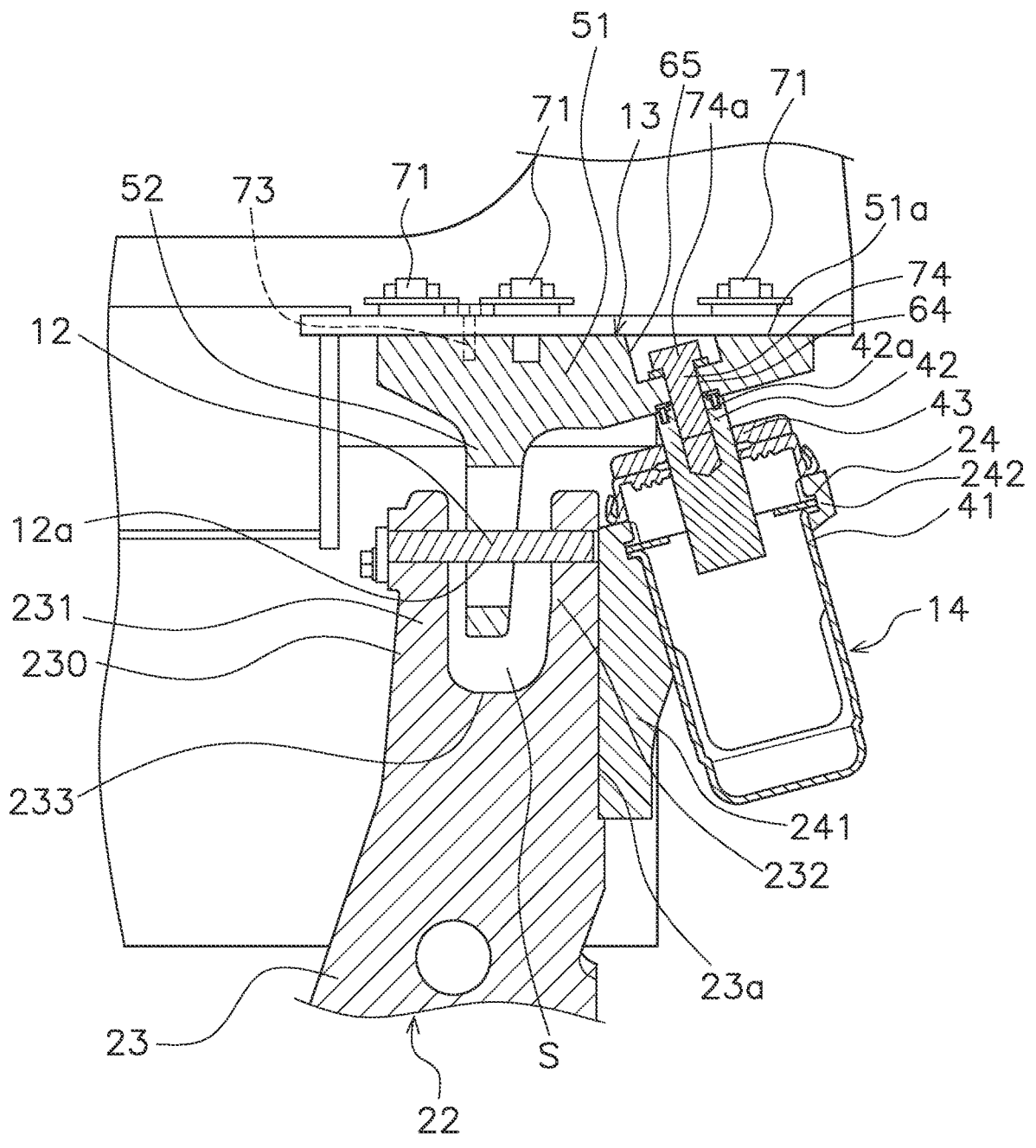
FIG. 11 is a side cross-sectional view of FIG. 10.

The rear side limiting sections 12 each have a rod shape such as, for example, a cylindrical shape. FIG. 10 is a side view illustrating the vicinity of the bracket 13. FIG. 11 is a side cross-sectional view of FIG. 10.

The rear side limiting sections 12 are fixed to the supporting members 22. The rear side limiting sections 12 are disposed at the tip end sections 230 of the first supporting sections 23.

The tip end sections 230 are divided into two branches. The tip end sections 230 each include a tip end front section 231, a tip end rear section 232, and a tip end valley section 233. The tip end front section 231 and the tip end rear section 232 are disposed facing each other in the front-back direction. The tip end valley section 233 is disposed between the tip end front section 231 and the tip end rear section 232. The tip end front section 231 and the tip end rear section 232 protrude further upward than the tip end valley section 233. A space S is provided between the tip end front section 231 and the tip end rear section 232. The rear side limiting sections 12 are supported by the tip end front sections 231 and the tip end rear sections 232. As illustrated in FIG. 11, the front end of each rear side limiting section 12 is inserted into a through-hole of the tip end front section 231, and the rear end of each rear side limiting section 12 is inserted into a through-hole of the tip end rear section 232. The center portion of each rear side limiting section 12 is disposed in the space S.

(Bracket 13)

The pair of left and right brackets 13 are connected to the cab 9. The left side bracket 13 is attached to the left end of the rear end of the high section 312 from below. The right side bracket 13 is attached to the right end of the rear end of the high section 312 from below. As illustrated in FIGS. 6 and 7, the left side bracket 13 and the right side bracket 13 are formed in left-right symmetry.

As illustrated in FIGS. 7 and 10, the brackets 13 each have an attachment section 51 and a limited section 52. The attachment section 51 is a portion attached to the floor section 31 of the cab 9. The attachment section 51 is plate-shaped. An upper surface 51a of the attachment section 51 is attached to the lower side of the floor section 31.

Figure 12:
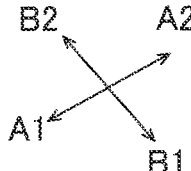
FIG. 12 is a perspective view of the bracket in an embodiment according to the present disclosure.

FIG. 12 is a perspective view of the bracket 13. The upper surface 51a of each bracket 13 has four bolt holes 61, four bolt holes 62, a positioning hole 63, and a stud fixing hole 64.

The bolt holes 61 are formed with a larger diameter than that of the bolt holes 62. Each bolt hole 62 is provided adjacent to one bolt hole 61 in the left-right direction. A total of four bolt hole pairs are provided as one bolt hole pair made up of one bolt hole 61 and the adjacent bolt hole 62.

A positioning pin 73 (see FIG. 11) disposed on the high section 312 of the cab 9 is inserted into the positioning hole 63. When attaching the brackets 13 to the cab 9, the positioning of the cab 9 with respect to the brackets 13 is performed by inserting the positioning pin 73 into the positioning hole 63. The positioning pin 73 protrudes downward from the high section 312.

As illustrated in FIG. 11, a bolt 74 for fixing the stud 42 of each rear side damper mount 14 is inserted into the stud fixing hole 64. A recessed section 65 is formed on the upper surface 51*a* side of the stud fixing hole 64. The head 74*a* of the bolt 74 is fitted into the recessed section 65. As a result, a configuration is achieved in which the head 74*a* of the bolt 74 does not protrude above the upper surface 51*a*.

Figure 13:
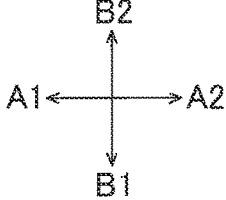
FIG. 13 is a plan view while the ceiling section of the cab is removed in an embodiment according to the present disclosure.

FIG. 13 is a plan view while the ceiling section 32 of the cab 9 is removed. As illustrated in FIG. 13, bolts 71 (example of a fastening member) inserted into the bolt holes 61 and bolts 72 (example of a fastening member) inserted into the bolt holes 62 are illustrated. Washers 75 are disposed between the floor section 31 and each bolt 71 that is inserted into one bolt hole 61 and each bolt 72 that is inserted into the adjacent bolt hole 62. One washer 75 is disposed for one pair of the bolts 71 and 72 corresponding to the pair of bolt holes 61 and 62.

As illustrated in FIGS. 7 and 10, the limited sections 52 extend from the attachment sections 51 toward the vehicle body frame 8. The limited sections 52 are each disposed around the rear side limiting sections 12. The limited sections 52 are spaced away from the rear side limiting sections 12. The limited sections 52 have a cylindrical shape and are disposed around the rear side limiting sections 12. The rear side limiting sections 12 pass through the limited sections 52. A gap is provided between each side surface 12*a* of the rear side limiting sections 12 and each limited section 52 and the rear side limiting sections 12 and the limited sections 52 do not come into contact.

The limited sections 52 are disposed in the space S between each tip end front section 231 and tip end rear section 232. A gap is provided between each limited section 52 and the tip end front section 231 and a gap is provided between each limited section 52 and the tip end rear section 232, and the limited sections 52 do not come into contact with the tip end front sections 231 and the tip end rear sections 232. Gaps are also provided between the limited sections 52 and the tip end valley sections 233 and the limited sections 52 do not come into contact with the tip end valley sections 233.

In this way, the limited sections 52 are provided with gaps with the rear side limiting sections 12 and do not come into contact with the rear side limiting sections 12. When the bulldozer 1 has a roll-over or the like, the limited sections 52 come into contact with the rear side limiting sections 12 when the cab 9 moves a distance equal to or greater than the gap with respect to the vehicle body frame 8, and further movement of the cab 9 with respect to the vehicle body frame 8 is limited. The gaps are set to distances such that the rear side limiting sections 12 and the limited sections 52 do not come into contact due to vibrations generated during normal work.

(Rear Side Damper Mount 14)

The left side rear side damper mount 14 among the pair of left and right rear side damper mounts 14 is disposed between the left side supporting member 22 and the cab 9. The right side rear side damper mount 14 is disposed between the right side supporting member 22 and the cab 9.

As illustrated in FIG. 11, each of the rear side damper mounts 14 have, in the same way as the front side damper mounts 10, a case 41, a stud 42, a buffering member 43, and a damping liquid (not illustrated). As illustrated in FIG. 10, the cases 41 are fixed to the damper supporting sections 242 of the second supporting sections 24.

The stud 42 is fixed to the bracket 13. The stud 42 is disposed on the case 41 and the tip end protrudes upward from the case 41. As illustrated in FIG. 11, a bolt hole 42*a* is formed in the tip end surface of each stud 42. Bolts 74 are inserted into the stud fixing holes 64 and the bolt holes 42*a* through the recessed sections 65 of the brackets 13. Consequently, the stud 42 is fixed to the bracket 13.

The buffering member 43 is disposed between the case 41 and the stud 42. The buffering member 43 is formed with an elastic material such as rubber. The damping liquid is filled inside the case 41. The damping liquid is a damping liquid having a high viscosity such as silicone oil.

In this way, the case 41 of each rear side damper mount 14 is fixed to the second supporting section 24 of the supporting member 22 and the stud 42 is fixed to the bracket 13, and vibration transmitted from the vehicle body frame 8 to the cab 9 is alleviated.

As described above, both the rear side damper mounts 14 and the rear side limiting sections 12 are disposed between the brackets 13 and the vehicle body frame 8 and the brackets 13 are connected to the cab 9 in the present embodiment. As a result, the cab 9 can be removed from the brackets 13 by simply removing the bolts 71 and 72 from the inside of the cab 9.

Characteristics (1)

The bulldozer 1 of the present embodiment comprises the vehicle body frame 8, the cab 9, the brackets 13, the rear side limiting sections 12, and the rear side damper mounts 14. The cab 9 is disposed on the vehicle body frame 8. The brackets 13 are connected to the cab 9. The rear side limiting sections 12 are disposed between the brackets 13 and the vehicle body frame 8 and limit the movement range of the cab 9 with respect to the vehicle body frame 8. The rear side damper mounts 14 are disposed between the brackets 13 and the vehicle body frame 8.

In this way, both the rear side damper mounts 14 and the rear side limiting sections 12 are disposed between the brackets 13 and the vehicle body frame 8 and the brackets 13 are connected to the cab 9. As a result, the rear side damper mounts 14 and the rear side limiting sections 12 can be removed from the cab 9 at the same time by simply removing the brackets 13 from the cab 9, and the releasability of the cab 9 from the vehicle body frame 8 can be improved.

(2)

The bulldozer 1 of the present embodiment further comprises the bolts 71 and 72 that pass through the floor section 31 of the cab 9 from the brackets 13 and protrude to the inside of the cab 9.

In the present embodiment, the abovementioned brackets 13 are fastened with the bolts 71 and 72 from the inside of the cab 9. As illustrated in FIG. 1, while it is easy to remove the front side damper mounts 10 and the front side limiting sections 11 from outside the cab 9 because there are no frame portions at the sides of the front section of the cab 9, the frame portion 27 is present at the sides of the rear section of the cab 9. In the present embodiment, because the fastening of the bolts 71 and 72 can be released from inside the cab 9, the cab 9 can be removed easily without disassembling the frame portion 27.

(3)

In the bulldozer 1 of the present embodiment, the vehicle body frame 8 has the frame body 21 and the supporting members 22. The supporting members 22 extend upward from the frame body 21. The rear side limiting sections 12 and the rear side damper mounts 14 are fixed to the supporting members 22.

As a result, the rear side limiting sections 12 and the rear side damper mounts 14 can be fixed to the vehicle body frame 8.

(4)

In the bulldozer 1 of the present embodiment, the positioning pin 73 is disposed in the cab 9. The positioning hole 63 into which the positioning pin 73 is inserted is formed in each bracket 13.

As a result, positioning can be performed easily when attaching the cab 9 to the brackets 13.

(5)

In the bulldozer 1 of the present embodiment, the rear side damper mounts 14 are disposed to the rear of the rear side limiting sections 12.

As a result, the lengths in the front-back direction between the front side damper mounts 10 and the rear side damper mounts 14 can be increased and the stability of the cab 9 with respect to vibration can me improved.

(6)

In the bulldozer 1 of the present embodiment, the supporting members 22 each have the first supporting section 23 and the second supporting section 24. The first supporting section 23 is in contact with and fixed to the frame body 21 and the rear side limiting section 12 is disposed thereto. The second supporting section 24 is in contact with and fixed to the first supporting section 23 and the rear side damper mount 14 is disposed thereto.

In this way, the supporting members 22 are divided by the first supporting section 23 to which the rear side limiting section 12 is disposed and the second supporting section 24 to which the rear side damper mount 14 is disposed, whereby manufacturing tolerances are absorbed and the studs 42 of the rear side damper mounts 14 can be easily attached to the brackets 13.

(7)

In the bulldozer 1 of the present embodiment, the brackets 13 each have the attachment section 51 and the limited section 52. The attachment sections 51 are attached to the cab 9. The limited sections 52 are formed oriented from the attachment section 51 toward the vehicle body frame 8 and are disposed around the rear side limiting section 12. The limited sections 52 are disposed spaced away from the rear side limiting sections 12.

As a result, when the cab 9 moves a predetermined distance or more from the vehicle body frame 8 during a roll-over, the rear side limiting sections 12 come into contact with the limited sections 52 and the movement of the cab 9 can be limited.

(8)

In the bulldozer 1 of the present embodiment, the rear side limiting sections 12 are rod-like members. The limited sections 52 are cylindrical members that are disposed such that a gap is opened around the entire circumference in the circumferential direction with the side surface 12*a* of the rod-like rear side limiting section 12.

As a result, when the cab 9 moves with respect to the vehicle body frame 8 a distance equal to or greater than the gap between the limited sections 52 and the rear side limiting sections 12, the limited sections 52 come into contact with the rear side limiting sections 12 and the movement of the cab 9 can be limited.

(9)

In the bulldozer 1 of the present embodiment, the rear side damper mounts 14 each have the case 41, the buffering member 43, and the stud 42. The cases 41 are fixed to the supporting members 22. The buffering members 43 are disposed inside the cases 41. The studs 42 are disposed in the cases 41 with the buffering members 43 interposed therebetween. The studs 42 are fixed to the brackets 13.

As a result, the cab 9 can be supported by the supporting members 22 via the rear side damper mounts 14.

OTHER EMBODIMENTS

Although an embodiment of the present invention has been described so far, the present invention is not limited to the above embodiment and various modifications may be made within the scope of the invention. In particular, a plurality of embodiments and modified examples written in the specification may be optionally combined as needed.

(A)

While the front side damper mounts 10 are directly connected to the cab 9 in the above embodiment, the front side damper mounts 10 may be connected to the cab 9 via brackets in the same way as the rear side damper mounts 14. In addition, while the limited sections 15 limited by the front side limiting sections 11 are connected directly to the cab 9, the limited sections 15 may be provided to the brackets in the same way as the limited sections 52.

Furthermore, while the front side damper mounts 10 and the front side limiting sections 11 are provided separately, the front side damper mounts 10 and the front side limiting sections 11 may be disposed side by side between the brackets and the vehicle body frame 8 as with the rear side damper mounts 14 and the rear side limiting sections 12.

(B)

While the positioning pins 73 are provided to the cab 9 and the positioning holes 63 are provided in the brackets 13 in the above embodiment, the positioning pins may be provided to the brackets and the positioning holes may be provided to the cab 9.

(C)

While the rear side limiting sections 12 have cylindrical shapes in the above embodiment, the rear side limiting sections 12 are not limited in this way and may have square columnar shapes.

(D)

While four bolts 71, four bolts 72, and four washers 75 are used for fastening the brackets 13 to the cab 9 in the above embodiment, the present invention is not limited to such a configuration so long as the brackets 13 are fastened to the cab 9.

(E)

While the bulldozer 1 has been exemplified as the work vehicle in the above embodiment, the present invention is not limited in this way and the work vehicle may also be a wheel loader, a motor grader, a shovel loader, a wheel loader, or a dump truck, so long as the work vehicle is provided with a cab.

According to the present disclosure, there can be provided a work vehicle with which it is possible to improve the releasability of the cab from the vehicle body frame.

What is claimed is:

1. A work vehicle comprising:
    a vehicle body frame;
    a cab disposed on an upper side of the vehicle body frame;
    brackets connected to the cab;
    limiting sections disposed between the brackets and the vehicle body frame, the limiting sections limiting a movement range of the cab with respect to the vehicle body frame; and
    buffering devices disposed between the brackets and the vehicle body frame,
    the brackets each having an attachment part attached to the cab, and a limited section formed from the attachment part toward the vehicle body frame, the limited section being disposed around the limiting section, and the limited section being disposed away from the limiting section.

2. The work vehicle according to claim 1, further comprising:

fastening members passing through a floor section of the cab from the brackets and protruding inside the cab.

3. The work vehicle according to claim 1, wherein the vehicle body frame has a frame body, and supporting members disposed facing upward from the frame body, and the limiting sections and the buffering devices are fixed to the supporting members.

4. The work vehicle according to claim 1, wherein positioning pins are disposed in one of the cab and the brackets, and positioning holes into which the positioning pins are inserted are formed in an other of the cab and the brackets.

5. The work vehicle according to claim 1, wherein the buffering devices are disposed to a rear of the limiting sections.

6. A work vehicle comprising:

a vehicle body frame;

a cab disposed on an upper side of the vehicle body frame;

brackets connected to the cab;

limiting sections disposed between the brackets and the vehicle body frame, the limiting sections limiting a movement range of the cab with respect to the vehicle body frame; and buffering devices disposed between the brackets and the vehicle body frame, the vehicle body frame having a frame body, and supporting members disposed facing upward from the frame body, and the limiting sections and the buffering devices being fixed to the supporting members, the supporting members each having a first supporting section in contact with and fixed to the frame body, the limiting section being disposed to the first supporting section, and a second supporting section in contact with and fixed to the first supporting member, the buffering device being disposed to the second supporting section.

7. The work vehicle according to claim 1, wherein the limiting sections are rod-shaped members, and the limited sections are cylindrical members disposed such that a gap is opened around an entire circumference in a circumferential direction with a side surface of the limiting sections.

8. The work vehicle according to claim 3, wherein the buffering devices each include a case fixed to the supporting member, a buffering member disposed inside the case, and a stud disposed in the case via the buffering member, and each stud is fixed to the bracket.

* * * * *